INVENTORS:
PAUL R. STAPLES
DONALD S. HEIDTMANN
BY Isidore Match
ATTORNEY

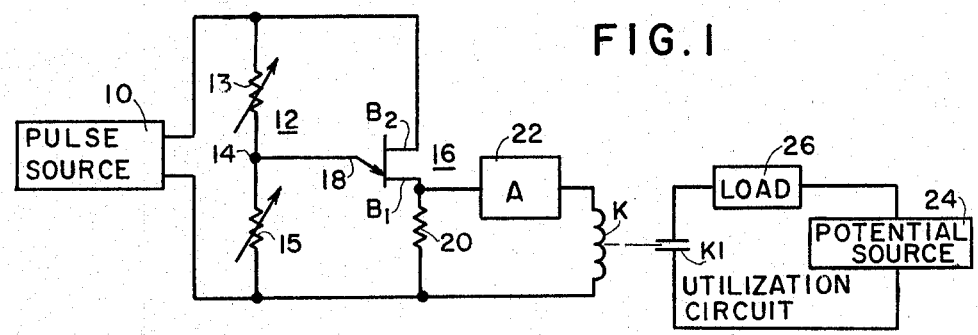
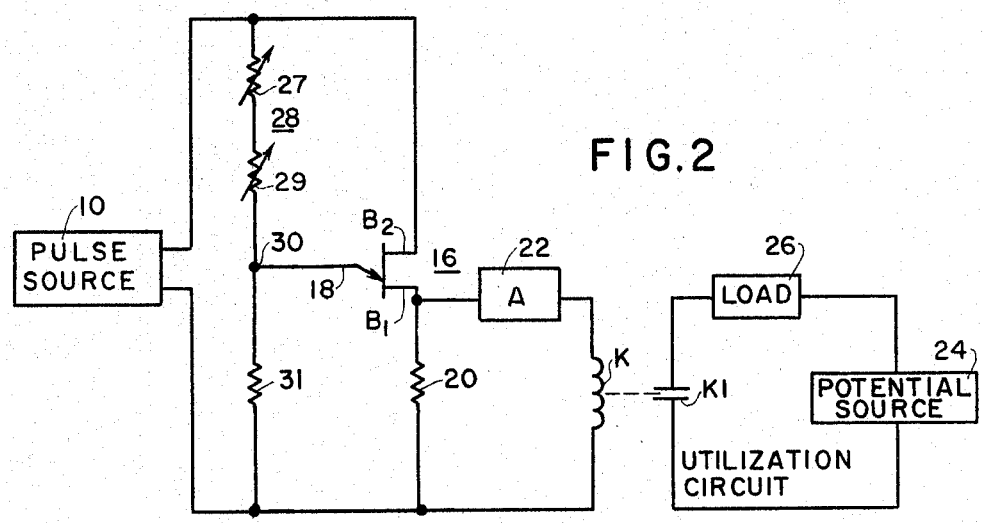

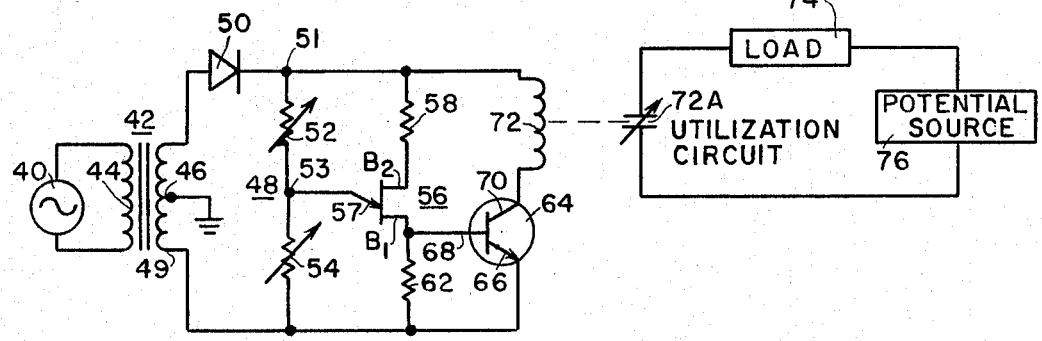
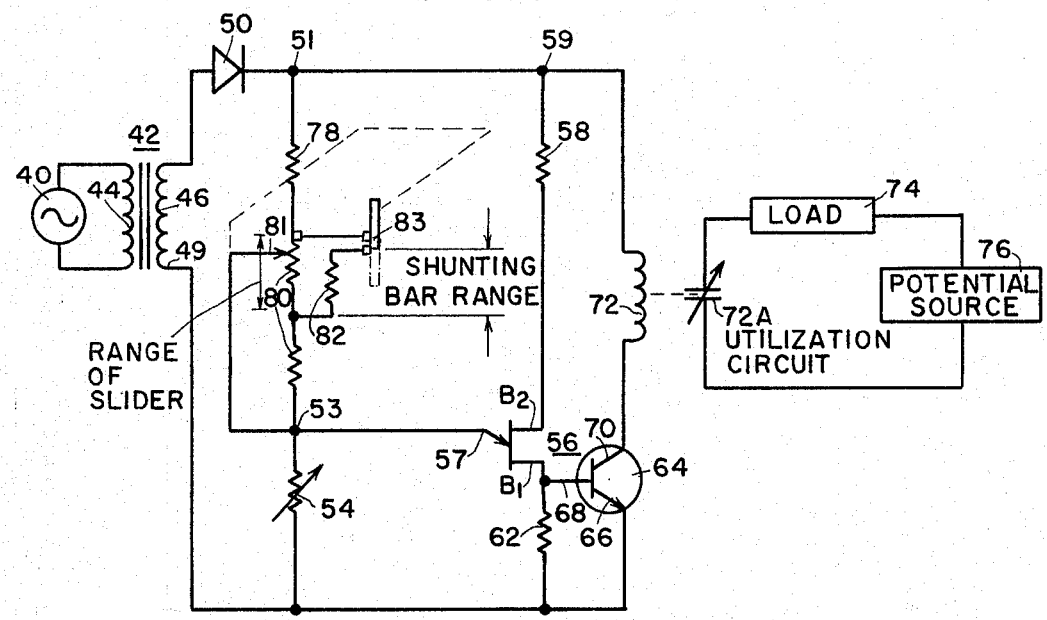

United States Patent Office 3,277,280
Patented Oct. 4, 1966

3,277,280
CONDITION RESPONSIVE CIRCUIT
Paul R. Staples and Donald S. Heidtmann, Louisville, Ky., assignors to General Electric Company, a corporation of New York
Filed July 1, 1963, Ser. No. 291,896
17 Claims. (Cl. 219—501)

This invention relates to condition responsive circuits. More particularly, it relates to an electrical circuit for controlling various discrete levels of a physical parameter that can produce a measurable change in electrical resistance, the circuit including appropriate means for sensing such change of resistance.

An embodiment of a circuit constructed in accordance with the principles of this invention has been utilized to control and automatically maintain a predetermined temperature for either a domestic cooking oven or for the surface heating units of a domestic range. The invention would also be useful for temperature controls in home heating systems, air conditioners, both gas and electric heating systems in general, as well as for humidity controls and hydraulic pressure controls.

In many situations, such as in apparatus wherein it is desired in the operation thereof to maintain uniform temperature therefor, such as, in electric ranges, for example, it is often required that, once a desired predetermined temperature level is selected for operation, that such temperature be maintained and not be exceeded. In electric ranges, provision may also be made for the producing of a selected band of discrete levels of temperature. The problem presented is to accurately maintain the range of temperatures at the respective selected discrete levels.

Heretofore, domestic range oven controls have consisted of spiral bimetal sensing elements which have had to be positioned within the interior of the oven. These sensing elements have had associated therewith a control mechanism such as an electrical switch or a flow valve and a selector knob, the control mechanism and knob being located in close proximity to the heated interior of the oven. This type of control presents many disadvantages in that it does not permit the accurate maintaining of a predetermined temperature level within the oven and that it cannot be remotely positioned with respect to such interior.

An improvement over the bimetal sensing element and associated control mechanism for controlling the temperature and maintaining a uniform temperature in the oven interior has been the substitution of a hydraulic bulb and bellows assembly for the abovementioned spiral bimetal element. With this substitution, greater accuracy is enabled in the control of oven interior temperature. Also, the control knob and housing for this control may be remotely located by means of a capillary tube from the hydraulic encapsulated liquid in the oven.

In recent years, there have been developed automatic surface unit controls for domestic ranges. Such controls have to have the ability to accurately control temperature under various load conditions, enable the boiling of water at various boil rates and at different elevations, provide for "boil dry" upper temperature limits, compensate for thermal mass of heating elements, include voltage and ambient temperature compensation arrangements, and have long life, and trouble free performance.

These automatic surface units controls have taken many forms such as (1) hydraulic sensor and switching elements, (2) bimetal sensors and switching elements, (3) thermistors associated with suitable switching means, and (4) high coefficient of resistance sensors in conjunction with hot wire relay switching means to control the application of electric power to heating elements.

Accordingly, it is an important object of this invention to provide a first electrical circuit which in response to changes from predetermined levels of a physical phenomenon, whose change in level produces a change in electrical resistance, causes an enabling or disabling of a second circuit which produces the phenomenon, the first circuit being capable of rapidly responding to such changes and thereby maintaining the predetermined levels.

It is a further object to provide a first circuit in accordance with the preceding object which may be remotely located with respect to the phenomenon which it is to control.

It is another object of this invention to provide in accordance with the preceding objects, a first circuit which responds rapidly to changes in temperature from predetermined discrete levels in a given environment to correspondingly cause the enabling or disabling of an electrical circuit whose operation provides the heat for said environment, the first circuit thereby accurately maintaining the aforesaid temperature at the predetermined levels.

It is still another object to provide a first circuit in accordance with the preceding objects wherein such circuit can constantly monitor at very short time intervals the temperature of the environment whereby the speed of response to changes in temperature therein is very rapid.

Generally speaking and in accordance with the invention, there are provided in combination, voltage divider means adapted to be connected across a potential source, the voltage divider means comprising first and second resistive components having different coefficients with respect to a physical phenomenon whose change in level can cause a change in electrical resistance, the components having a junction therebetween. An active device is included having a control electrode connected to the junction and an output electrode, the active device being actuated in response to the attaining of a given level of the potential at the junction. In circuit with the output electrode there is provided means capable of being in an energized state and concurrently energized with the actuation of the active means. A utilization circuit contains an element capable of assuming one of two positions to permit current to flow or to prevent current from flowing therein, this element being caused to change its position in response to a change of state of the aforesaid energizable means.

The features of this invention which are believed to be new are set forth with particularity in the appended claims. The invention itself, however, may best be understood by reference to the following description when taken in conjunction with the accompanying drawings which show embodiments of a circuit according to the invention.

In the drawings,

FIGS. 1 and 2 are schematic diagrams of a condition responsive circuit embodying the principles of the invention;

FIG. 3 is a schematic diagram of an embodiment of a temperature responsive circuit constructed in accordance with the principles of the invention;

FIG. 4 is a schematic diagram of a circuit similar to that of FIG. 3 and containing a modification thereof;

Figure 5:
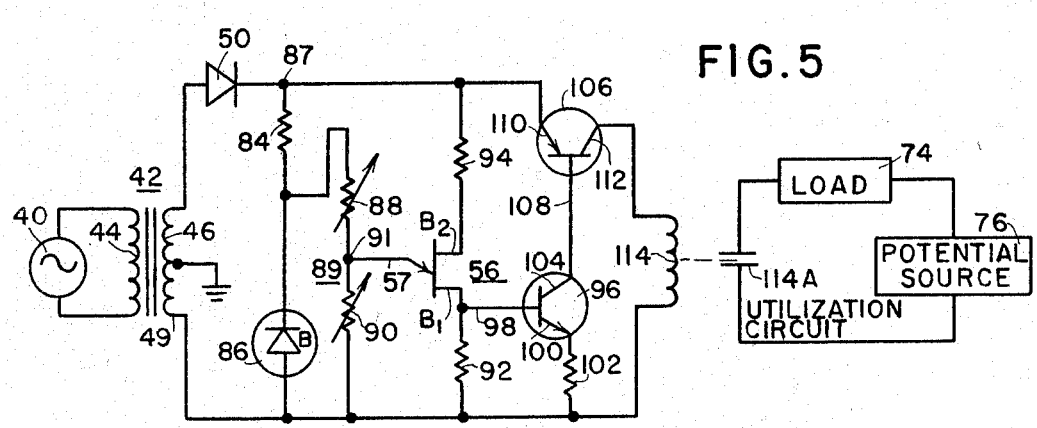
FIG. 5 is a schematic diagram of another embodiment of the invention.

Prior to describing the structure and operation of the embodiments of the invention depicted in the drawings, it is to be noted that all of the illustrative embodiments preferably employ a unijunction transistor although the invention can be utilized with similar devices such as thyratrons and other active elements which are efficacious in relaxation oscillator and like circuits.

The unijunction transistor is described in detail in U.S. Patent 2,769,926 of I. A. Lesk and titled "Non-Linear Resistance Device," assigned to the General Electric Company. Briefly, the unijunction transistor may be described as having an elongated semiconductor body with a bilaterally conducting electrode or base at either extremity, and a rectifying junction intermediate the ends thereof. In normal operation, a unidirectional bias is applied between the bilaterally conducting electrodes, and the junction electrode is biased at a potential intermediate the inter-base potentials. The precise operating potential is usually selected to provide operation in the region of the potential at which the voltage at the junction boundary is near zero, a condition providing the minimum current at the junction. This is the region of greatest non-linearity. If now, the potential at the junction electrode is varied to provide a greater reverse bias, as by the application thereto of the signal voltage, relatively little additional current flows through the device, and it presents a relatively high impedance both to the inter-base bias source as well as to the signal source coupled in circuit with the junction. If, however, the signal source provides a slightly forward bias to the junction, holes or electrons (depending upon whether the device is a PN or an NP type device) injected into the bar suddenly lower the impedance of the device in the portion of the bar between the junction and the base in the easy current flow direction. The sudden drop of impedance causes a large and sudden increase in current both through the junction as well as between the bases.

Referring now to FIG. 1, wherein there is shown a circuit embodying the principles of the invention, the output of a pulse source 10 which may suitably be a circuit for producing a half wave or full wave rectified output of an A.C. source having a frequency such as the normal line frequency of 60 cycles is applied to a voltage divider 12 comprising a sensor portion 13, i.e., a resistance having a positive coefficient with respect to a given physical phenomenon and an adjustor portion 15 preferably having a substantially zero coefficient with respect to such given phenomenon. The junction 14 of portions 13 and 15 is connected to the emitter 18 of a unijunction transistor 16 which is connected across voltage divider 12 in its base $B_2$ to base $B_1$ path. The output appearing at base $B_1$ developed across a resistor 20, may be applied to an amplifier 22, the output of the amplifier being applied to the operating element of a relay K. A utilization circuit comprises the series arrangement of a potential source 24, a load 26 which in operation produces or responds to the physical phenomenon whose level is being controlled and a pair of contacts K1 associated with relay K.

In the circuit of FIG. 1, the sensor portion, i.e., resistance 13 is suitably located to be exposed to the physical phenomenon. Load 26 may be a heating element powered by electric current where heat is to be produced, electrical humidity controlling equipment, and the like. The other elements of the arrangement of FIG. 1 such as resistance portion 15, i.e., the adjustor portion, pulse source 10, unijunction transistor 16 and amplifier 22 may be remotely located from load 26.

In the operation of the circuit of FIG. 1, the output from source 10 is developed across voltage divider 12. The values of portions 13 and 15 are so chosen that while the physical phenomenon being maintained at a given level is below this level, the voltage at junction 14 is one which effects conduction in unijunction transistor 16, the output of the latter being amplified in amplifier 22. Such amplified output operates relay K to cause switching of the position of contacts K1 whereby current is enabled to be supplied to load 26 from potential source 24 or whereby current is removed from load 26. By change of position of contacts K1 is meant the change from the normally open to the closed or from the normally closed to the open positions, the former situation being shown in FIG. 1. Thus, if load 26 is a heating element, then contacts K1 may be in the normally open position. Now, when the physical phenomenon attains or is on the verge of attaining the given level at which it is to be maintained, the voltage at junction 14 falls to a level where unijunction transistor 16 is not rendered conductive whereby relay K is not energized. Consequently, contacts K1 revert to their normal position and current is either removed from or supplied to load 26 from potential source 24 depending upon the normal position of contacts K1. Clearly, while the physical phenomenon is at a given level, unijunction transistor 16 is not conductive. However, should it drop below the given level, unijunction transistor 16 would be rendered conductive and, consequently, relay K would be energized to cause the switching of current supply to load 26.

It is seen that, effectively, unijunction transistor and consequently the utilization circuit can respond to the load at the frequency of the output of pulse source 10. Thus, if the output of pulse source 10 is a half wave rectified A.C. voltage having a 60 cycle per second frequency, then unijunction transistor 16 and, consequently, the utilization circuit are enabled to respond to the change in the physical phenomenon below the given level every $\frac{1}{60}$ of a second. If the output of pulse source 10 is a full-wave rectified A.C. voltage having a 60 cycle per second frequency, then, unijunction transistor 16 and, consequently the utilization circuit can respond to the change in the physical phenomenon each $\frac{1}{120}$ of a second.

It is thus seen that with the circuit of FIG. 1, there is enabled precise and accurate control of a desired parameter. Pulse source 10 may suitably include a semiconductor diode rectifier and amplifier 22 may be of the transistor type whereby the circuit of FIG. 1 is a solid state control which is substantially free of maintenance problems as compared to electro-mechanical devices and may be of much smaller size, be much less expensive, and have much longer life than vacuum tube circuitry. The use of the unijunction transistor in conjunction with a pulsating unidirectional supply and the voltage divider enables the sensing of very small changes in resistance and the rapid response thereto.

The operation wherein unijunction transistor is enabled to respond to the phenomenon level each $\frac{1}{60}$, $\frac{1}{120}$ of a second, etc. enables the establishment of a precise threshold of operation and the sensor resistance, i.e., resistance portion 13 with the positive coefficient of resistance controls whether or not unijunction transistor 16 is conductive. Such operation permits the use of a minimum number of parts, i.e., parts that don't change values with age, and which lend themselves to manufacture from standard parts.

The value of resistance portion 13, i.e., the sensor portion, is chosen to be low enough such that if unijunction transistor 16 is rendered conductive, it will remain conductive for the remaining portion of a half cycle, effectively the total half cycle.

The sensor resistance portion, i.e., portion 13 which has a positive temperature coefficient wherein temperature is being controlled may suitably be a nickel-iron wire, a positive thermistor, and the like. The adjustor resistance portion, i.e., portion 15, which has a substantially zero to nominal coefficient where temperature is being controlled may suitably be constantan or like material, etc.

The circuit of FIG. 2 is quite similar to that of FIG. 1 and, accordingly, corresponding circuit components therein have been designated with the same numerals. The circuit of FIG. 2 differs from FIG. 1 in that, connected across pulse source 10, is a voltage divider 28 comprising the series arrangement of a variable resistance portion 27 having a positive coefficient of resistance with respect to a change in level in the physical phenomenon, a variable resistance portion 29 have a substantially zero coefficient of resistance with respect to the physical phenomenon and a resistor 31. The emitter 18 of unijunction transistor 16 is connected to the junction 30 of resistance portion 29 and resistor 31.

The operation of the circuit of FIG. 2 is substantially similar to that of FIG. 1 except that unijunction transistor 16 is rendered conductive when the sum of the resistance values of portions 27 and 29 is below a chosen value and is rendered nonconductive when this sum exceeds this chosen value.

Although, the sensor resistive portions of the circuits of FIGS. 1 and 2 have been described as being of the positive coefficient type, it is, of course, evident that they may also be of the negative coefficient type within the contemplation of the principles of the invention.

Referring now to FIG. 3 wherein there is shown an embodiment of a temperature responsive circuit constructed in accordance with the principles of the invention, the output of an alternating current potential source 40 is applied to a primary winding 44 of a transformer 42. The potential appearing in secondary winding 46 of transformer 42 is applied to a voltage divider 48 connected thereacross through a forward-biased diode 50 which serves to half-wave rectify the alternating current potential output of source 40. Voltage divider 48 suitably comprises a variable resistive portion 52 which suitably has a zero to nominal temperature coefficient of resistance and a variable resistive portion 54 having a positive and relatively high temperature coefficient of resistance. Resistive portion 52 is utilized to select the temperature range and resistive portion 54 is employed to sense temperature as will be further explained hereinbelow. A unijunction transistor 56 comprises a second base $B_2$ connected to the junction 51 of diode 50 and resistive portion 52 through a resistor 58 and a first base $B_1$ connected to terminal 49 of secondary winding 46 throught a resistor 62. The emitter 57 of unijunction transistor 56 is connected to the junction 53 of resistive portions 52 and 54. The output of unijunction transistor 56 is taken from base $B_1$ and applied to the base of a transistor 64. Transistor 64 also comprises an emitter 66 connected to terminal 49 and a collector 70 connected to junction 51 through the operating element of a relay 72 which may be of the electromagnetic, hot wire, or bimetal type.

The utilization circuit comprises a load 74 which is being heated and whose temperature is being monitored in series arrangement with a potential source 76 which may be of the alternating current or unidirectional current type and a pair of normally closed contacts 72A operatively associated with relay 72.

In the operation of the circuit of FIG. 3, let it be assumed that it is desired to prevent load 74 from exceeding a chosen temperature, such load suitably being an electric range or other electrically operated heating device. Resistance portion 54, i.e., the sensor is included in the same environment as load 74, i.e., for example inside or on the surface of the range. The temperature responsive circuit senses the temperature of load 74 and causes disabling of the utilization circuit when a chosen temperature is on the verge of being attained.

In effecting such operation, positive half cycles of the alternating current potential output of source 40 appear across voltage divider 48 due to the half wave rectifying action of diode 50. The values of resistive portions 52 and 54 and the values of resistors 58 and 62 are so chosen whereby, when the temperature of the load is on the verge of attaining the chosen temperature, the voltage at junction 53 rises to a sufficient level to render unijunction transistor 56 conductive, and a positive voltage output appears at base $B_1$ while junction 53 is at such level. Consequently, transistor 64 which is suitably chosen to be of the NPN type in the arrangement of FIG. 1 and normally cutoff, is rendered conductive. When this occurs, the operating element of relay 72 is energized to cause the opening of normally closed contacts 72A, and current from source 76 is removed from load 74. This causes a drop in the temperature of the load and the environment in which the temperature responsive circuit is located. At a point where the temperature has dropped sufficiently to cause the voltage at junction 53 to fall below the necessary firing level for unijunction transistor 56, it is rendered nonconductive and transistor 64 is consequently also rendered nonconductive. Consequently, the operating element of relay 72 is deenergized whereby contacts 72A resume the closed position and current is again supplied to load 74 from source 76.

In the arrangement of the circuit of FIG. 3, unijunction transistor 56 responds to the voltage at junction 53 during every alternating current cycle from source 40, during the positive half cycles thereof. Effectively, therefore, the voltage at junction 53 and accordingly, the temperature of load 74 is monitored once during every alternating current cycle to ascertain whether heat is or is not called for.

In the circuit of FIG. 3, transformer 42, in addition to effecting the application of the D.C. power from source 40 to the circuit, operates to depress transients in the output of source 40. The ($I^2R$) heating in resistive portion 54 at the time that contacts 72A are closed and the load is being brought up to temperature provides anticipation for the thermal mass of the heating system. In other words, because of the electrical curent flowing through resistive portion 54, resistive portion 54, being self-heated by electrical current flowing through it, operates as if a higher temperature other than what may actually exist occurs during the heating up of load 74. Consequently, the load circuit is disabled prior to the actual attainment of the load of the chosen temperature, i.e., when it is on the verge of attaining such temperature. Accordingly, the thermal inertia of the system is compensated for.

In FIG. 4, the circuit shown therein is substantially the same as that of FIG. 3 except that resistive portion 52 of FIG. 3, the temperature range adjustor, has been replaced with the series arrangement of a resistor 78 and a varaible resistor 80, both having a zero to nominal temperature coefficient of resistance such as resistive portion 52 in the circuit of FIG. 3, a slider 81 being associated with variable resistor 80. Ganged with slider 81 is the series arrangement of a resistor 82 shunting a portion of resistor 80 and a shunting bar 83.

In the operation of the circuit of FIG. 4, the range that slider 81 can be moved on resistor 80 determines the temperature range. Shunting bar 83 is constructed such that it is in circuit with variable resistor 80 for a chosen range such as depicted on FIG. 4, and is out of circuit beyond the limits of this range. Thus, when slider 81 is moved within the range that the shunting bar is in circuit and such shunting bar is simultaneously moved, the temperature selection sensitivity of the circuit can be greatly refined. The shunting bar arrangement, for example, could be utilized to give low, medium and high boil points of water when used with a range surface unit.

In FIG. 5 wherein there is shown a second illustrative embodiment of a circuit constructed in accordance with the invention, those circuit elements which correspond to circuit elements in the circuit of FIGS. 3 and 4 are designated with the same corresponding numerals. In the circuit of FIG. 5, the A.C. potential from source 40 is applied across the series arrangement of a resistor 84 and a breakdown diode 86 through half-wave rectifying diode 50. The regulated potential appearing across diode 86 is applied across the series arrangement of a variable resistive portion 88 having a positive high temperature coefficient of resistance, i.e., the temperature sensor and a variable resistive portion 90 having a zero or nominal temperature coefficient of resistance, i.e., the temperature adjustor. The unijunction transistor 56 has its base $B_1$ connected to terminal 49 of secondary winding 46 through a resistor 92 and its base $B_2$ connected to the junction 87 of diode 50 and resistor 84 through a resistor 94. The output appearing at base $B_1$ is applied to the base 98 of an NPN transistor 96, the emitter 100 of this transistor being connected to terminal 49 through a resistor 102 and its collector 104 being connected to the base 108 of a PNP transistor 106. In transistor 106, the emitter 110 is connected to junction 87 and the collector 112 is connected to terminal 49 through the operating element of a relay 114 which suitably may be of the hot wire, bimetal or electromagnetic type. In the utilization circuit, the contacts 114A associated with relay 114 are normally in the open state.

In the operation of the circuit of FIG. 5, constant voltage is applied across the voltage divider 89 comprising resistive portions 88 and 90 due to the action of breakdown diode 86. The voltage breakdown value of diode 86 is so chosen that the firing point for unijunction transistor 56, i.e., the firing level voltage at junction 91 occurs at the leading edges along the steep portions of the half wave cycles produced at the output of diode 50. This enables the production of a relatively high amplitude high percentage duty cycle pulse train output from unijunction transistor 56 when load 74 is near or below the desired temperature. The voltage at junction 91 of resistive portions 88 and 90 rises with a decrease in temperature and falls with an increase in temperature of sensor portion 88. Thus, assuming that a chosen temperature is selected for load 74, while the load is being brought up to this temperature, the voltage at junction 91 will be sufficiently high to successively pulse unijunction transistor 56 at successive positive half cycles of output from source 40 whereby transistors 96 and 106, which are connected in complementary symmetry arrangement, are simultaneously conductive and the operating element of relay 114 is correspondingly pulsed. Accordingly, contacts 114A are closed and current is supplied to load 74. When the temperature attains a point just on the verge of the chosen temperature, the voltage at junction 91 falls to a level where unijunction transistor 56 is no longer rendered conductive by the next occurring positive half cycle from source 40 and transistors 96 and 106 are correspondingly cutoff with a resulting deenergization of the operating element of relay 114. Accordingly, contacts 114A assume the open position and current is removed from the load. Now, when the temperature drops to a point below the desired level, the rise in potential at junction 91 again renders unijunction transistor 56 conductive.

The circuit of FIG. 5 has been found to be very sensitive and may be used to control any variable that can be sensed through a change in resistance, for example, pressure flow, radiation, light intensity, etc. Breakdown diode 86 operates to provide voltage compensation for fluctuations in the output of the A.C. source and for transient suppression therein. It enables consistent rather than erratic operation of the unijunction transistor and permits the application of increased power to relay 114 since unijunction transistor 56 is rendered conductive near the beginning of the positive half cycle instead of near or at the peak.

The employment of the arrangement in FIG. 5 wherein contacts 114A associated with relay 114 are in the normally open state permits use of a lower cost power transistor 106 and higher power enabling ability thereby. Also, the time that the operating coil of the relay is in the energized state is much less than the time that it is in the deenergized state whereby it is subjected to less heat over a time integrated basis and consequently has a longer life.

Resistor 94 is utilized to provide ambient temperature compensation.

Figure 6:
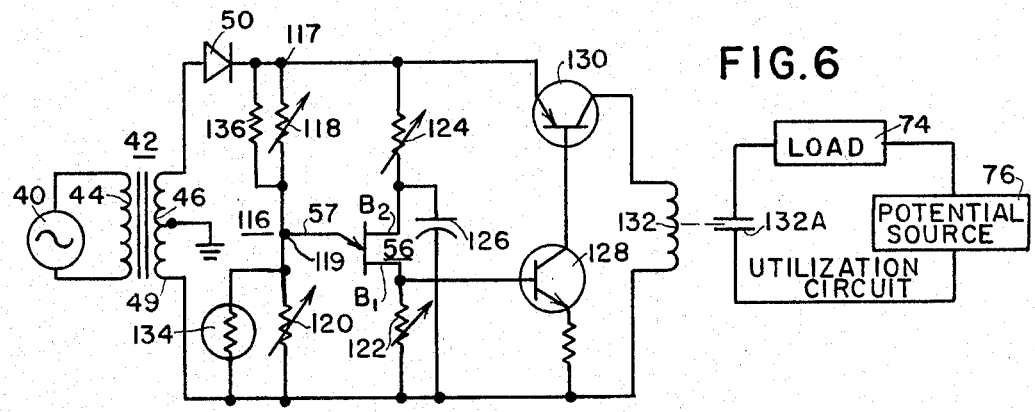
FIG. 6 is a schematic depiction of a modification of the embodiment of FIG. 5.

In FIG. 6 wherein there is shown another embodiment of a temperature responsive circuit constructed in accordance with the principles of the invention, the output of A.C. source 40 is applied across the voltage divider 116 comprising a variable resistive portion 118 having a high positive temperature coefficient of resistance, i.e., the temperature sensor portion, and a variable resistive portion 120 suitably having a zero to nominal temperature coefficient of resistance, i.e., the temperature range adjustor portion, through half wave rectifying diode 50. The unijunction transistor 56 has its emitter 57 connected to the junction 119 of resistive portions 118 and 120, its base $B_1$ connected to terminal 49 through a variable resistor 122 and its base $B_2$ connected to the junction 117 of diode 50 and resistive portion 118 through a variable resistor 124. Base $B_2$ is also connected to terminal 49 through a capacitor 126. The output appearing at base $B_1$ is applied to the complementary symmetrical arrangement of an NPN transistor 128 and a PNP transistor 130, the operating element of a relay 132 being connected in the collector circuit of transistor 130. Contacts 132A associated with relay 132 are in the normally open state. The circuit of FIG. 6 operates in substantially the same manner as the circuits of FIGS. 3 to 5. The use of a variable base $B_2$ resistor 124 enables the control of the sensitivity of the circuit and also the control of its stability whereby erratic performance of the circuit may substantially be eliminated. With this arrangement, the amount of the opening and the closing of contacts 132A is minimized. The circuit of FIG. 6 accordingly has a very consistent degree of repeatability. A resistor 134 having a negative temperature coefficient of resistance such as a thermistor may be connected in shunt with the temperature adjustor resistive portion 120 to compensate for fluctuations in ambient temperature. Such compensation could also be effected by placing a resistor 136 having a high positive temperature coefficient of resistance in shunt with temperature sensor resistive portion 118.

Capacitor 126 connected between base $B_2$ and terminal 49 operates to enable the firing of the unijunction 56 at the steep portions of the leading edges of the applied voltage positive half cycles similar to the operation of breakdown diode 86 in the circuit of FIG. 5. In this connection, capacitor 126 produces a phase shift between the voltage applied to base $B_2$ with respect to the voltage present at emitter 57. The lagging of the voltage at base $B_2$ permits unijunction transistor 56 to fire at the aforesaid steep portions of the slopes of the half cycles of the applied pulsating unidirectional voltage. This results in effectively applying almost all of the half wave power to relay 132.

Figure 7:
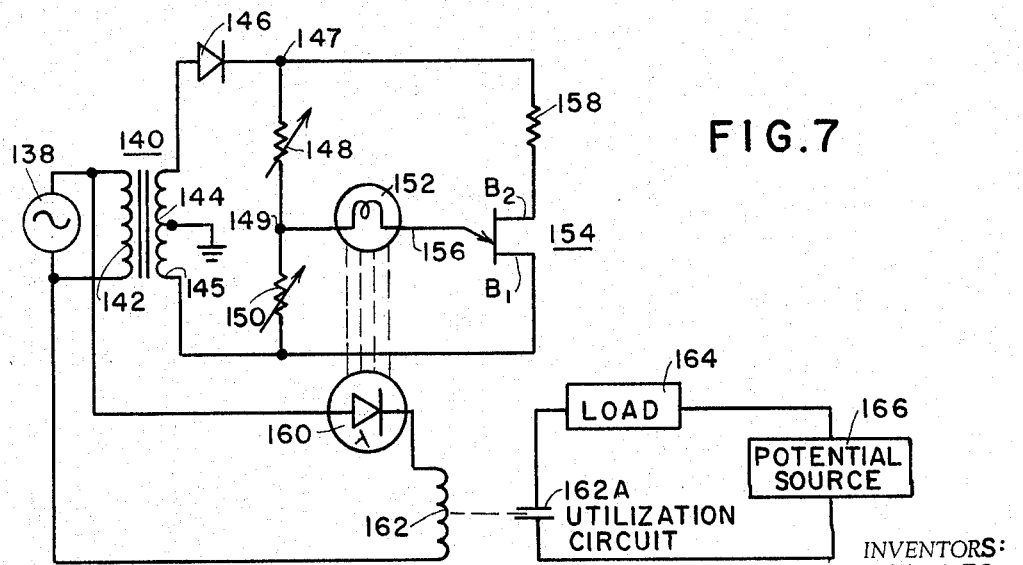
FIG. 7 is a diagram of another embodiment of the invention.

In the circuit of FIG. 7, the voltage from an A.C. source 138 is applied across a voltage divider comprising a resistive portion 148 having a positive high temperature coefficient of resistance, i.e., the temperature sensor, and a resistive portion 150 having a zero to nominal temperature coefficient of resistance, i.e., the temperature range adjustor, through a half wave rectifying diode 146. Connected between the junction 149 of resistive portions 148 and 150 and the emitter 156 of a unijunction transistor 154 is a lamp 152. The unijunction transistor 154 has its base $B_2$ connected to the junction 147 of diode 146 and resistive portion 148 through a resistor 158 and its base $B_1$ connected to terminal 145 of secondary winding 144. Connected between the two terminals of primary winding 142 of transformer 140 is the series arrangement of a light sensitive PNPN silicon controlled semiconductive device 160 or other type device which undergoes the photoconductive effect and the operating coil of a relay 162 which may suitably be of the electromagnetic type. In the utilization circuit, the load 164 is in series arrangement with a potential source 166 and the normally open contacts 162A associated with relay 162.

In the operation of the circuit of FIG. 7, while the load is below the desired chosen temperature, sufficient voltage is applied to emitter 156 of unijunction transistor 154 from junction 149 through pilot lamp 152 to render unijunction transistor 154 conductive and to illuminate pilot lamp 152. The light from pilot light 152 gates PNPN device 160 into conductivity whereby the A.C. power from source 138 is applied to the operating coil of relay 162 and contacts 162A consequently assume the closed position to enable the supplying of current to load 164 to bring it up to the desired temperature. When the temperature of load 164 attains a value on the verge of such desired temperature, the voltage at junction 149 falls to a point where unijunction transistor 154 is rendered nonconductive and pilot lamp 152 is extinguished. Consequently, PNPN device 160 is not gated into conductivity upon the application thereto of the next positive half cycle of A.C. voltage from source 138 and relay 162 is deenergized to cause the opening of contacts 162A and the removal of the current supply to load 164. It is to be noted that the circuit of FIG. 7 presents the advantage that the relay portion is completely isolated from the voltage divider, pilot lamp, unijunction transistor portion.

It is to be realized that the circuit of FIG. 7, similar to the circuits of FIGS. 1 and 2, may also be utilized for controlling discrete levels of physical phenomena other than temperature; viz., humidity, hydraulic pressure, etc.

While there have been described what are considered to be the preferred embodiments of this invention, it will be obvious to those skilled in the art that various changes and modification may be made therein without departing from the invention and it is, therefore, aimed in the appended claims to cover all such changes and modifications as fall within the true spirit and scope of the invention.

What is claimed as new and desired to be secured by Letters Patent of the United States is:

1. In combination, a pulsed potential source, a voltage divider comprising a pair of resistive portions having a junction therebetween adapted to be connected across said pulsed potential source, each of said portions having different coefficients of resistance in response to a physical phenomenon in which a change in level causes a change in resistance, active means connected across said divider and having a control electrode connected to said junction, said active means being rendered conductive upon the attaining of a potential of a chosen level at said junction, first means capable of being in the energized and deenergized states in circuit with said active means, a utilization circuit comprising a potential source, a load which exhibits said phenomenon to be supplied by electric current, and second means capable of assuming a first position to cause current from said voltage source to be supplied to said load and a second position to cause said current to be removed from said load, said second means changing its position in response to the change of state of said first means, the potential at said junction varying in response to the change in the level of said physical phenomenon.

2. In combination, a pulsed potential source, a voltage divider comprising a pair of resistive portions having a junction therebetween adapted to be connected across said pulsed potential source, each of said portions having different temperature coefficients of resistance, a unijunction transistor connected in its second base to first base path across said divider and having an emitter connected to said junction, said unijunction transistor being rendered conductive upon the attaining of a potential of a chosen level at said junction, a relay in circuit with said unijunction transistor capable of being in an energized or deenergized state, a utilization circuit comprising a voltage source, a load to be heated by electric current and a pair of contacts operatively associated with said relay and capable of being in either an open or a closed position, said contacts changing position in response to the change of state of said relay, the potential at said junction varying in response to the varying of the temperature of said load.

3. In combination, a voltage divider comprising a pair of resistive portions having a junction therebetween adapted to be connected across a pulsed potential source, one of said portions having a positive temperature coefficient of resistance, the other of said portions having a substantially zero temperature coefficient of resistance, a unijunction transistor connected in its second to first base path across said divider and having a control electrode connected to said junction, said unijunction transistor being rendered conductive upon the attaining of a potential of a chosen level at said junction, amplifying means in circuit with said unijunction transistor and adapted to be rendered conductive in response to the rendering conductive of said unijunction transistor, a relay capable of being in the energized and deenergized states in circuit with said amplifying means, a utilization circuit comprising a voltage source, a load to be heated by electric current and a pair of contacts associated with said relay and capable of assuming a first position to cause current from said voltage source to be supplied to said load and a second position to cause said current to be removed from said load, said contacts changing position in response to a change of state of the relay means, the potential at said junction varying in response to the temperature of said load.

4. A circuit for controlling the temperature of an electrically heated device comprising a voltage divider comprising a pair of resistive portions having a junction therebetween adapted to be connected across a pulsed potential source, one of said portions having a positive temperature coefficient of resistance, the other of said portions having a substantially zero temperature coefficient of resistance, a unijunction transistor having a control electrode connected to said junction and a second base to first base path connected across said divider, said unijunction transistor being rendered conductive in response to the attaining of a given potential at said junction, a relay connected in circuit with the output of said unijunction transistor, a pair of contacts operatively associated with said relay in circuit with said device and a voltage source, said contacts being adapted to be in a first position in response to the deenergized state of said relay and in a second position in response to the energized state of said relay, current being supplied from said voltage source to said load when said contacts are in one of said positions and removed from said load when said contacts are in the other of said positions, the potential at said junction varying in response to the temperature of said load.

5. A circuit for controlling the temperature of an electrically heated device comprising a voltage divider comprising a pair of resistive portions having a junction therebetween adapted to be connected across a pulsed potential source, one of said portions having a positive temperature coefficient of resistance, the other of said portions having a substantially zero temperature coefficient of resistance, a unijunction transistor having its control electrode connected to said junction and its second base to first base path connected across said divider, said unijunction transistor being rendered conductive upon the attaining of a chosen potential level at said junction, amplifying means in circuit with said unijunction transistor, a relay in circuit with said amplifying means, an arrangement comprising a voltage source, said device and a pair of contacts operatively associated with said relay, said contacts assuming a first position in response to the deenergized state of said relay and a second position in response to the energized state of said relay, current being supplied to said load from said voltage source when said contacts are in one of said positions and removed from said load when said contacts are in the other of said positions, the potential at said junction varying in response to the temperature of said load.

6. A circuit operable by a source of alternating current potential for controlling the temperature of an electrically heated device comprising the series arrangement of half wave rectifying means adapted to be connected across said source, a voltage divider comprising a first resistance having a positive temperature coefficient and a second resistance having a substantially zero temperature coefficient adapted to be connected across said rectifying means to apply positive half cycles of potential from said source across said divider, the potential at the junction of said resistances varying directly with a rise in temperature, a unijunction transistor having an emitter connected to said junction and a second to first base path connected across said divider, said unijunction transistor being rendered conductive upon the attaining of a chosen potential level at said junction, an amplifier having a control electrode coupled to said unijunction transistor, a reference electrode and an output electrode, a relay, a series arrangement of said relay and the reference to output electrode path of said amplifier being connected across said unijunction transistor, said amplifier being conductive concurrently with said unijunction transistor, a load circuit comprising said device, a voltage source and a pair of contacts operatively associated with said relay which are in the closed position when said relay is in the deenergized state and in the open position when said relay is in the energized state, the potential at said junction varying in response to the temperature of said device.

7. A circuit as defined in claim 6 and further including a third resistance between said second base and the junction of said half wave rectifying means and said first resistance.

8. A circuit as defined in claim 6 wherein said first resistance is a variable resistance having a slider mechanically operatively associated therewith, and further including a shunting bar which is ganged with said slider and which is caused to be placed in circuit with a given portion of said first resistance in response to a chosen degree of movement of said slider.

9. A circuit operable by an alternating current potential source for controlling the temperature of an electrically heated device comprising the series arrangement of half wave rectifying means, a first resistance and a breakdown diode adapted to be connected across said source to produce a train of positive pulses of substantially uniform amplitude at the junction of said resistance and said breakdown diode, the series arrangement of a second resistance having a positive temperature coefficient and a third resistance having a substantially zero temperature coefficient connected across said breakdown diode, a unijunction transistor having a control electrode connected to the junction of said second and third resistances and its second base to first base path connected across the series arrangement of said first resistance and said breakdown diode, amplifying means having an input coupled to said unijunction transistor and an output, a relay connected in the output of said amplifying means, a circuit comprising a voltage source, said device and a pair of contacts which are in the open position in response to the deenergized state of said relay and in the closed position in response to the energized state of said relay, the potential at the junction of said second and third resistances varying in response to the temperature of said device.

10. A circuit as defined in claim 9 wherein said unijunction transistor is rendered nonconductive upon the attaining of said device of a predetermined temperature and wherein said amplifying means comprises a pair of transistors connected in cascaded complementary symmetry arrangement.

11. A circuit operable by an A.C. source for controlling the temperature of an electrically heated device comprising the series arrangement of half wave rectifying means, a first resistance having a positive temperature coefficient and a second resistance having a substantially zero temperature coefficient adapted to be connected across said source to produce positive half cycles from said source across said series arrangement of said first and second resistances, a unijunction transistor having an emitter connected to the junction of said first and second resistances, a second base connected to the junction of said rectifying means and said first resistance through a third variable resistance and a first base connected to said second resistance through a fourth resistance, amplifying means having an input coupled to said first base and an output, a relay in circuit with said output, an arrangement of a voltage source, said device and a pair of contacts operatively associated with said relay, said contacts assuming the open position when said relay is in the deenergized state and the closed position when said relay is in the energized state, said unijunction transistor and said amplifying means being conductive when the temperature of said device is below a given level.

12. A circuit as defined in claim 11 and further including a capacitor connected between said second base and said second resistance.

13. A circuit as defined in claim 11 and further including a thermistor connected across said second resistance.

14. A circuit as defined in claim 11 and further including a resistance having positive temperature coefficient connected across said first resistance.

15. In combination, a voltage divider comprising a pair of resistive portions having a junction therebetween adapted to be connected across a potential source, each of said portions having different coefficients of resistance in response to a physical phenomenon in which a change in level causes a change in resistance, a unijunction transistor having a second first base path connected across the series arrangement of said first and second resistances and an emitter, a lamp connected between the junction of said resistances and said emitter, a series arrangement of a photosensitive device disposed to receive the light from said lamp and a relay connected across said source, a circuit arrangement comprising a voltage source, a load to be supplied by electric current and exhibiting said phenomenon and a pair of contacts which assume a first position to cause current from said voltage source to be supplied to said load and a second position to cause current to be removed from said load, said unijunction transistor being rendered conductive and said lamp being illuminated when the potential at said junction represents a level of said phenomenon different from a predetermined level, said photosensitive device and said relay having current supplied thereto when said lamp is illuminated.

16. A circuit operable by a source of alternating current potential for controlling the temperature of an electrically heated device comprising the series arrangement of half wave rectifying means, a first resistance having a positive temperature coefficient and a second resistance having a substantially zero temperature coefficient adapted to be connected across said source, a unijunction transistor having a second to first base path connected across the series arrangement of said first and second resistances and an emitter, a lamp connected between the junction of said resistances and said emitter, a series arrangement of a photosensitive device disposed to receive the light from said lamp and a relay connected across said source, a circuit arrangement of a voltage source, said device and a pair of contacts which assume the open position in response to the deenergized state of said relay and assume the closed position in response to the energized state of said relay for supplying current to said device to heat said device when said relay is in the energized state, said unijunction transistor being rendered conductive and said lamp being illuminated when the potential at said junction is at a level which represents a temperature of said device less than a predetermined temperature, said photosensitive device and said relay having current supplied thereto when said lamp is illuminated.

17. A circuit is defined in claim 16 wherein said photosensitive device is a PNPN device which is gated into conductivity upon the application of light thereto.

References Cited by the Examiner

UNITED STATES PATENTS

| | | | |
|---|---|---|---|
| 3,026,505 | 3/1962 | Bevilacqua | 317—148.5 |
| 3,106,647 | 10/1963 | Danko | 307—88.5 |
| 3,114,025 | 12/1963 | Blauvelt et al. | 219—494 |

RICHARD M. WOOD, *Primary Examiner.*

L. H. BENDER, *Assistant Examiner.*